E. H. LUDEMAN.
FLEXIBLE COUPLING.
APPLICATION FILED JUNE 26, 1917. RENEWED JUNE 30, 1919.

1,322,128.

Patented Nov. 18, 1919.
2 SHEETS—SHEET 1.

Inventor
Edwin H. Ludeman
by Geo. E. Tew
Attorney

E. H. LUDEMAN.
FLEXIBLE COUPLING.
APPLICATION FILED JUNE 26, 1917. RENEWED JUNE 30, 1919.
1,322,128. Patented Nov. 18, 1919.
2 SHEETS—SHEET 2.
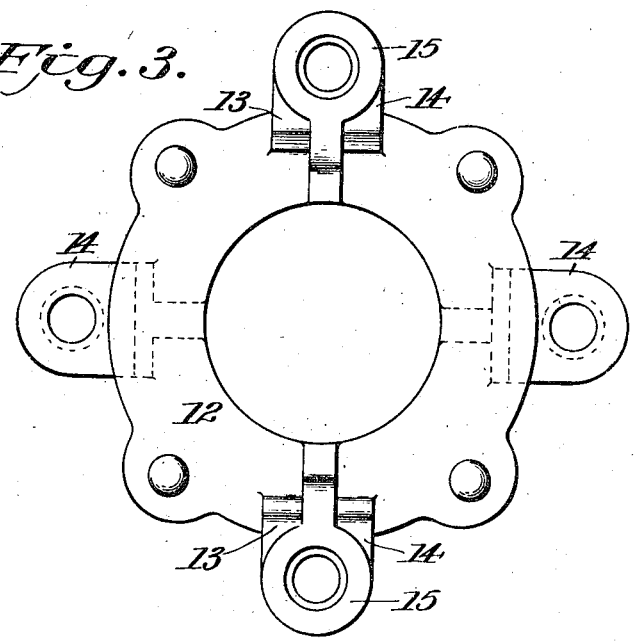
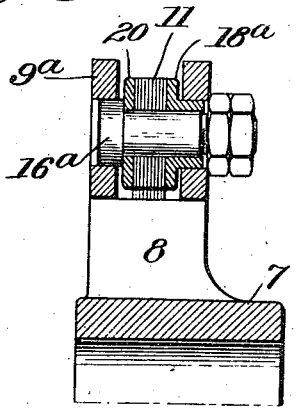 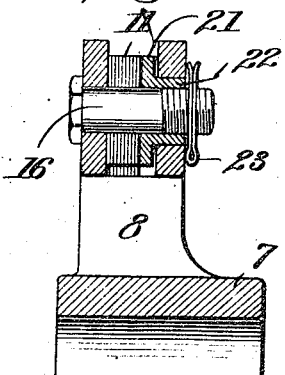
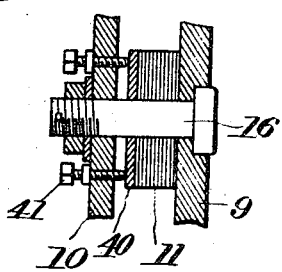
Inventor
Edwin H. Ludeman
By
Attorney

UNITED STATES PATENT OFFICE.

EDWIN H. LUDEMAN, OF NEW YORK, N. Y.

FLEXIBLE COUPLING.

1,322,128.  Specification of Letters Patent.  Patented Nov. 18, 1919.

Application filed June 26, 1917, Serial No. 177,003. Renewed June 30, 1919. Serial No. 307,785.

*To all whom it may concern:*

Be it known that I, EDWIN H. LUDEMAN, a citizen of the United States, residing at New York city, in the county of New York and State of New York, have invented certain new and useful Improvements in Flexible Couplings, of which the following is a specification.

This invention relates to flexible couplings of that type containing flexible rings which are connected at intervals to the coupling heads or members for the purpose of transmitting power between adjacent shaft sections and permitting angular variation in the shafts as well as axial variations or offsets.

In my pending application No. 154,521, there is shown and described a coupling of this type in which the rings are set at the rear or inner sides of the coupling heads, especially for the purpose of decreasing the space between the shaft sections.

The present invention is designed as an improvement on the coupling shown in said application, with respect particularly to the manner in which the rings are attached to the heads. The present invention provides a double shear support or connection for the flexible rings. That is, the bolts which connect the rings to the heads are supported at both ends, or on both sides of the flexible rings, thereby giving added strength to the coupling. Also, improved means are provided for clamping the rings to the heads, especially by washers having tubular extensions which are set in recesses formed in the coupling heads or members. The invention also has advantages with respect to assembling the parts.

In the accompanying drawings—

Fig. 3 is a side elevation of one of the coupling members.

Figs. 4, 5 and 6 are details in section of modifications having different clamping devices.

Figure 1:
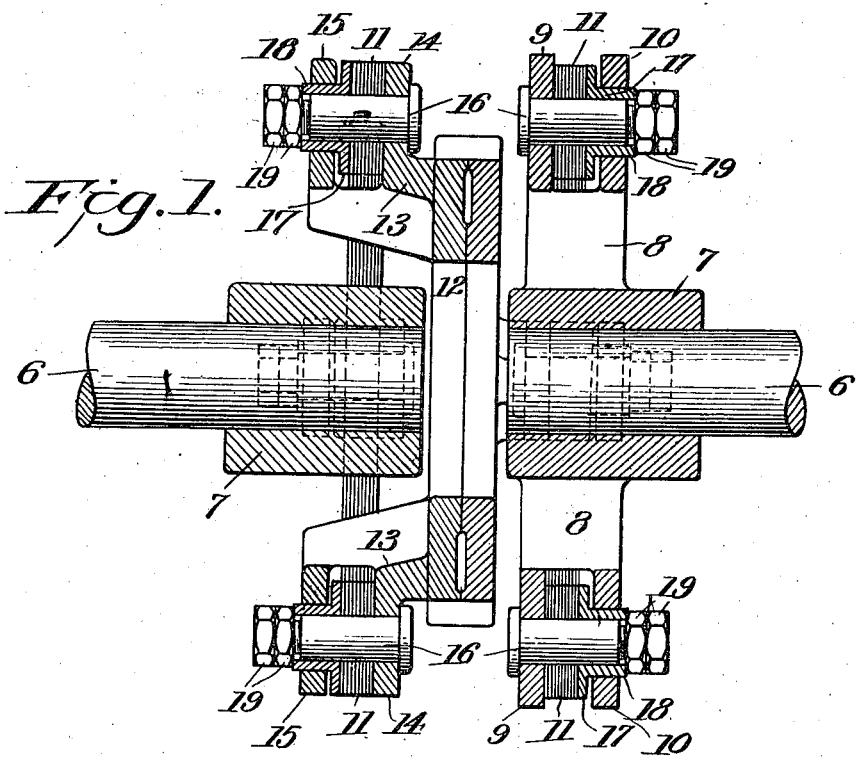
Figure 1 is a longitudinal section of a coupling containing the improvement.
Figure 2:
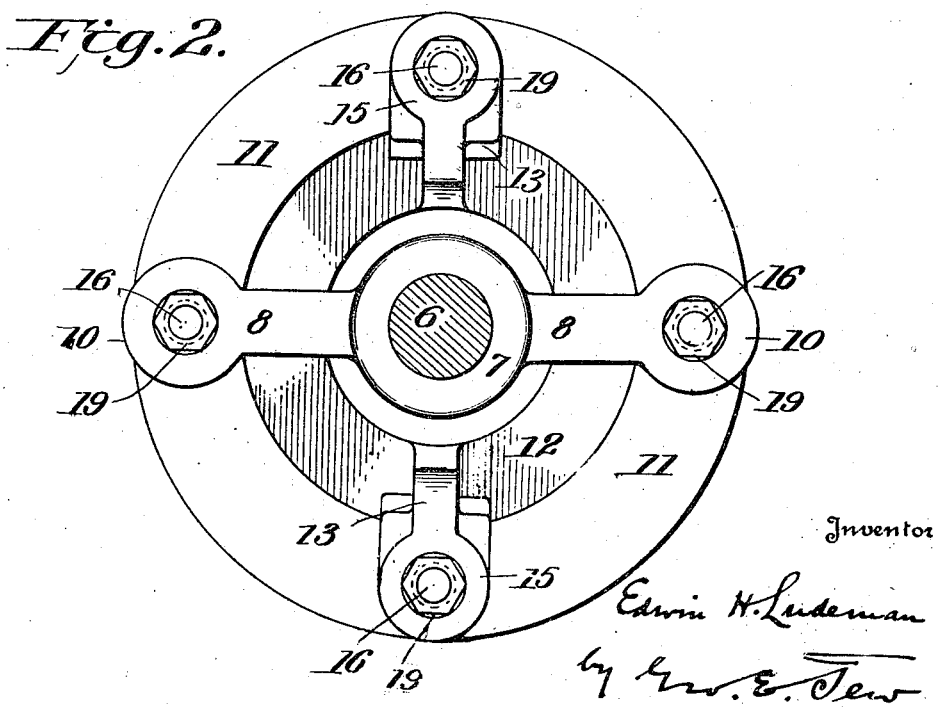
Fig. 2 is a cross section thereof.

Referring specifically to the drawings 6 indicates the adjacent shaft sections. To the end of each shaft section is keyed or otherwise secured a coupling head or member consisting of a hub 7 having radial arms 8 symmetrically arranged, and at their outer ends these arms are forked or divided to form opposite walls 9 and 10 spaced apart, the walls extending transversely and one being located at the front of the head and the other at the rear, the space being somewhat wider than the thickness of the flexible ring which extends through the same. This ring is preferably laminated, as indicated at 11, being built up of sections or plates, preferably semi-circular, with their ends lapped, as described and claimed in the application mentioned above.

In the form shown in Fig. 1 an intermediate or floating coupling member or ring is employed, located between the heads, said ring being indicated at 12. This may be made in one piece or in two pieces bolted together as shown. This floating ring or member is provided at symmetrical or regular intervals, corresponding with the number of points of attachment, with offset arms 13 on opposite sides alternately, and the ends of these arms are forked or divided to produce front and rear radially extending walls 14 and 15, the arms being offset far enough to bring the walls, or the spaces between the walls, in line circumferentially with the corresponding walls or spaces of the adjacent heads, whereby the rings when assembled will extend around in said spaces.

It will be understood that the flexible rings are fastened alternately to the arms of the central member and the arms on the hubs, the number of arms on each corresponding and being located at equal distances apart.

Ordinarily, two arms will be provided on each hub and four arms on the central member, each pair of the latter being offset oppositely to register with the arms on the hubs, but this number may be varied or increased as desired, to vary the number of points of attachment.

To connect the flexible or laminated rings with the adjacent parts I provide bolts 16. In the form shown in Fig. 1, these bolts extend through holes in the walls 9 and 10 of the heads and the walls 14 and 15 of the middle member, whereby the bolt is supported at both of its ends, or on opposite sides of the flexible ring, which gives a double shear effect and a strong and rigid connection between the rings and the other coupling members. For clamping the rings, a washer 17 is sleeved over each bolt, and each washer has a tubular projection 18 which surrounds the bolt and fits in or extends through the opening in one of the walls 10 or 15 as shown.

The flexible rings are clamped against the wall 9 or 14 at the points of attachment, by means of the washers and the nuts 19 on the threaded ends of the bolts, the nuts setting against the outer ends of the tubular extensions on the washers, and when the nuts are set up the rings are clamped solidly against the opposite wall of the arms.

It will be seen that the spaces between the walls of the forks at the ends of the arms are open at the outside or periphery, and by making the rings in sections they can be set in or assembled from the outside without disturbing the heads or taking down the coupling. Consequently, if any ring or plate section becomes broken it can be readily renewed. Furthermore, this construction retains the advantages of the close up construction, because the flexible rings are located inside or to the rearward of the hub faces or shaft ends, with a great increase of strength by reason of the two point support for the connecting bolts.

In the modification shown in Fig. 4, the head of the bolt 16$^a$ fits in the recess in the outer wall 9$^a$ of the radial arm on the coupling member, and the rings 11 are clamped between a plain washer 20 under the head of the bolt and an extended washer 18$^a$ on the opposite side, this arrangement also giving the shearing support in the two walls of the arms, at opposite ends of the bolt.

In the modification shown in Fig. 5, the washer and nuts on the bolt are, in a sense, combined, the washer being indicated at 21, with a threaded tubular extension 22 thereon which screws on the end of the bolt, and may thus be set up against the flexible ring 11 to clamp the same against one of the walls, and fastened by a cotter pin 23, the extended part 22 of the washer fitting closely in an opening in one wall and the head end of the bolt extending through the other wall, so that the double support is provided for the bolt.

In the modification shown in Fig. 6 the clamping means are not mounted on the main fastening bolt 16, but a pair of screws 41 are tapped through the outer wall 10 of the radial arm and set up against the washer 40 on the bolt 16, to press the washer against the rings 11.

Various other modifications are possible within the scope of the invention, which is not limited to the particular forms shown and described.

I claim:

1. In a flexible coupling, the combination of a head having arms forked to produce two spaced walls, a flexible ring extending through the space between said walls, and a fastening device extending through said ring and supported at opposite sides of the ring in said walls.

2. In a flexible coupling, the combination with coupling members having arms the outer ends of which are recessed to produce opposite walls, and a flexible ring connected to said members, of a fastening device supported at its opposite ends in said walls and engaging the ring between said ends.

3. In a flexible coupling, the combination of axially opposite members, one of which has arms the outer ends of which are recessed to produce spaced walls, a flexible ring extending between said walls and connecting said members, and a fastening device extending through said ring and walls.

4. In a flexible coupling, the combination of rigid coupling members having alternating arms with spaced walls, a flexible ring connecting said members and extending between said walls, and a fastening device extending through said ring and walls, said fastening device being provided with means to clamp the ring against one of said walls.

5. In a flexible coupling, the combination of rigid coupling members having spaced walls, a laminated flexible ring connecting said members and extending between said walls, a fastening device extending through said ring and supported on opposite sides thereof in said walls, and a clamping member mounted on said device and engaging the ring.

6. In a flexible coupling, the combination of coupling members one of which has spaced walls, a flexible ring connecting said members and extending between said walls, a bolt extending through the ring and the walls, and a washer on the bolt, clamped against the ring, and having a tubular part surrounding the bolt in one of said walls.

7. In a flexible coupling, the combination of coupling members, one of which has spaced walls, a flexible ring connecting said members and extending between said walls, a bolt extending through the ring and the walls, and a washer on the bolt, clamped against the ring, and having a tubular part surrounding the bolt in one of said walls, and extending through the wall, the bolt having a nut thereon bearing against the outer end of said tubular part, to clamp the washer against the ring.

8. In a flexible coupling of the type having opposite members, the combination of a member having radial arms with rigid spaced walls at the outer ends thereof, a flexible ring connecting said members and extending between said walls, and a fastening device extending through said ring and walls.

In testimony whereof I affix my signature in presence of two witnesses.

EDWIN H. LUDEMAN.

Witnesses:
DAVID H. REID,
IDA DALCHER.